Patented Sept. 8, 1953

2,651,632

UNITED STATES PATENT OFFICE 2,651,632

BETA - KETOALKYL - QUINAZOLONES AND ACID SALTS THEREOF AND METHODS OF MAKING THE SAME

Bernard Randall Baker, Nanuet, N. Y., and Merle Vernon Querry, Westwood, N. J., assignors to American Cyanamid Company, New York, N. Y., a corporation of Maine No Drawing. Application January 10, 1951,
Serial No. 205,421

25 Claims. (Cl. 260—251)

1

This invention relates to new beta-ketoalkyl-quinazolones and acid salts thereof, and methods of making the same.

The new class of beta-keto-alkyl-quinazolone compounds of this invention, when in the form of their free bases, may be represented by the following formula:

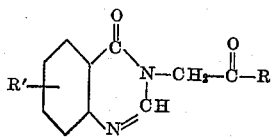

in which R is an organic radical attached to the carbonyl group by a carbon-to-carbon linkage and R' is hydrogen or at least one substituent on the benzene ring of the quinazolone nucleus. The new quinazolone compounds may be isolated as the free base, or, if desired, they may also be isolated in the form of their acid salts, i. e., as the hydrochloride.

The substituent or substituents represented by R' in the above formula may vary within wide limits and may be on one or more of the five, six, seven or eight positions of the quinazolone nucleus. Substituents of the following types are of value: halogen, for instance, Cl, Br, and Fl; alkoxy and aryloxy, for instance, —OCH₃, —OC₂H₅, —OCH₂C₆H₅, and —OC₆H₅; hydroxyl radicals; lower alkyl radicals, for instance, methyl, ethyl, propyl and butyl; aryl radicals, for instance, phenyl and substituted phenyl radicals; acyl radicals, for instance, —COR in which R is hydrogen or lower alkyl; acyloxy radicals, for instance, —OCOR in which R may represent H or lower alkyl; carboxyl radicals (—COOH) and the esters, amides and salts thereof.

The radical represented by R in the above formula may also vary within wide limits as long as it is connected to the carbonyl group by a carbon-to-carbon linkage. Specific illustrations of radicals which may be represented by R are as follows: alkyl radicals, for instance, methyl, ethyl and propyl; substituted alkyl, for instance, aminoethyl, phthalimidopropyl, (1-carbethoxy-3-methoxymethyl-2-pyrrolidylmethyl (2-tetrahydrofuryl) ethyl, and the like; aromatic radicals, for instance, phenyl; substituted aromatic, for instance, tolyl and the like; heterocyclic radicals, for instance, pyrrolidyl, benzopyrryl, phenoxypyrryl, pyridyl, N-3,5-dinitrobenzoyl-3-piperidyl, and the like.

The new beta-ketoalkyl-quinazolones of this invention have a wide range of utility. For instance, some of the new compounds are of interest

2 in the field of dye intermediates, others are of interest as accelerators for various chemical reactions, others are valuable intermediates in the synthesis of pharmaceuticals, and some have therapeutic value themselves. It is intended, however, that this invention cover the new compounds per se and it is not to be construed as being limited to any particular field of utility.

While it is not intended that this invention be limited to beta-keto-alkyl-quinazolones made by any specific process, a particularly convenient method of preparing the new compounds has been discovered and this new method also constitutes a part of this invention. The new method comprises reacting a quinazolone derivative with a methyl ketone derivative in accordance with the following equation:

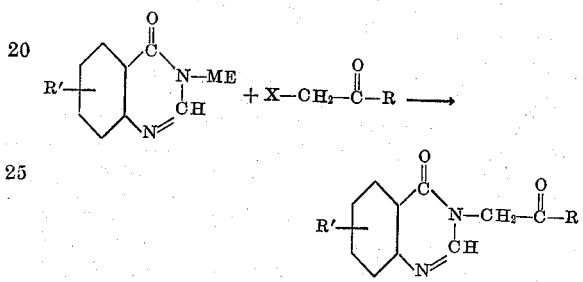

in which ME is metal or the equivalent; X is halogen or the equivalent, and R and R' are as defined above.

The methyl ketone derivative above is preferably a halomethyl ketone: that is, X in the above equation represents halogen, for instance, chlorine, bromine, or iodine. Because of the ease of preparation and their advantageous reaction velocities, the bromomethyl ketone derivatives are preferred. However, there are certain radicals which are recognized equivalents of the halogens for condensation reactions and methyl ketone derivatives of these may also be employed in the process of this invention. Examples of such equivalent radicals may be illustrated by

and

The quinazolone derivative in the above general equation is preferably a metalo-quinazolone formed either from a mono or polyvalent metal. Examples of suitable metals are the following: alkali metals, for instance, sodium, potassium, and lithium; alkaline earth metals, for instance, calcium and barium. Because of the ease of preparation and advantageous reaction velocity, the sodio-quinazolones are preferred. Again, there are certain recognized equivalents of the metals and the quinazolone derivatives of these are also suitable for the process of this invention. For example, certain quaternary ammonium derivatives of quinazolones are quite satisfactory.

The quinazolone derivatives above described may be conveniently prepared from a quinazolone and a strong base of the metal or equivalent. Examples of suitable bases are: metal hydroxides, for instance, sodium hydroxide, and barium hydroxide; quaternary ammonium bases, for instance, trimethyl benzyl ammonium hydroxide and tetraethyl ammonium hydroxide; metal hydrides, for instance, sodium hydride; metal amides, for instance, sodamide; metal alcoholates, for instance, sodium methoxide; metal alkylides, for instance, ethyllithium; and other bases of this type.

In general, it will be found convenient to perform the reaction of the quinazolone derivatives with the methyl ketone derivative in an inert solvent or diluent. Any inert liquid may be used but for reasons of convenience, the lower alcohols, such as methanol, ethanol, propanol, 2-methoxyethanol, and the like are the most satisfactory. Examples of other inert liquids which may be used are the simple ethers, for instance, methyl or ethyl ether; cyclic ethers, for instance, dioxane; aralkyl alcohols, for instance, benzyl alcohol; and esters, for instance, ethylacetate. When a solvent is employed the quinazolone derivative may advantageously be formed in situ without the need of isolation.

Temperature in the above reaction is not critical and the reaction may satisfactorily be carried out at room tempearture. It has, however, been found that higher temperatures favor the reaction, and the reaction may generally be advantageously performed at temperatures between 25° and 85° C. While convenience would ordinarily limit one to the reflux temperature of the solvent employed, the reaction may be, if desired, carried out at temperatures up to the decomposition temperature of the reactants or reaction product. Also in some cases, for instance when there is a tendency for one or both of the reactants to engage in side reactions, it has been found advantageous to perform the reaction at very low temperatures, for instance —3° C. Here again one is ordinarily limited, as a matter of convenience, by the solidification temperature of the solvent employed.

The reaction proceeds immediately at room temperature and in most instances is substantially complete in about one to four hours. The reaction in most instances is substantially complete in about ten to thirty minutes at 80° C. and in a proportional length of time at intermediate temperatures.

The invention is more fully illustrated by the following examples in which all parts are by weight unless otherwise specified:

*Example I*

A solution of .25 part by weight of piperidyl-2-acetic acid (Ber., 35, 1348) in 4.1 parts by volume of 1 N sodium hydroxide is vigorously shaken with 0.21 part by volume of benzoyl chloride for ten minutes, then acidified with hydrochloric acid. The mixture is extracted with chloroform. Evaporation of the extracts and crystallization from benzene-heptane gives about .18 part by weight of white crystals of 1-benzoyl-2-piperidyl acetic acid, having a melting point of 144°–145° C. This compound is soluble in hot water, insoluble in cold water or petroleum ether, but readily soluble in alcohol, chloroform or benzene.

To a suspension of 5 parts by weight of 1-benzoyl-2-piperidylacetic acid in 25 parts by volume of acetyl chloride is added 4.5 parts by weight of phosphorus pentachloride. After twenty minutes the solvent is removed in vacuo and the evaporation repeated with 50 parts by volume of toluene. The resultant acid chloride dissolved in 25 parts by volume of benzene is added to an ice-cooled ethereal solution of diazomethane (prepared from 10.5 parts by weight of nitrosomethylurea). After ten minutes in the ice-bath and one hour at room temperature, 5 parts by volume of acetic acid followed by 21 parts by volume of 30% hydrogen bromide in acetic acid are added. The mixture, after five minutes, is washed with water, aqueous sodium bicarbonate and water. Evaporation of the solvent in vacuo gives about 5.2 parts by weight of 1-benzoyl-2-(γ-bromoacetonyl) piperidine as an orange oil which is soluble in all common solvents except water and the petroleum ethers.

To a solution of .225 part by weight of 4-quinazolone in 1.55 parts by volume of 1 N methanolic sodium methoxide is added a solution of 0.58 part by weight of 1-benzoyl-2-(γ-bromoacetonyl) piperidine in 5.8 parts by volume of methanol. After one hour the solution is diluted with 25 parts by volume of water and 10 parts by volume of 10% sodium hydroxide, then extracted with chloroform. The extracts are evaporated to dryness and the residue converted to the hydrochloride with alcoholic hydrogen chloride. There is obtained a yield of about .42 part by weight of white crystals of 3-[β-keto-γ-(1 - benzoyl - 2 - piperidyl)propyl] - 4 - quinazolone hydrochloride, having a melting point of 195°–196° C. This compound is soluble in cold water, hot methanol or ethanol, but insoluble in acetone, ethyl acetate, benzene or petroleum ether.

*Example II*

To a solution of 7 parts by weight of sodium methoxide in 100 parts by volume of methanol there is added 20.6 parts by weight of 3-chloro-3-carbethoxy-2-piperidone (J. Am. Chem. Soc. 71, 2818 (1949)). The solution is refluxed and stirred for ninety minutes, acidified with acetic acid and cooled. The salt is removed by filtration and the filtrate evaporated to dryness. A little water is added and the solution extracted with chloroform. The solvent is removed in vacuo and the residue distilled. The product is a colorless viscous oil, having a boiling point of 142°–150° C. (0.15 mm.) which solidifies and melts at 60°–67° C. Several recrystallizations from benzene-petroleum ether gives white crystals of 3-methoxy-3-carbomethoxy-2-piperidone having a melting point of 79.5° to 80° C. This compound is readily soluble in water, alcohol, acetone and benzene, but insoluble in petroleum ether.

A solution of 36.4 parts by weight of 3-methoxy-3-carbomethoxy-2-piperidone in 122 parts by volume of 6 N hydrochloric acid is refluxed for one hour and then evaporated to dryness in vacuo. The resulting crude 2-methoxy-5-aminovaleric acid hydrochloride, is dissolved in 430 parts by volume of water containing 37.3 parts by weight of sodium hydroxide, then treated dropwise with 60 parts by volume of benzyl chlorocarbonate with stirring and ice-cooling at such a rate that the temperature is 6°–8° C. After being stirred an additional forty-five minutes, the mixture is extracted with ethyl acetate. Acidification of the aqueous phase gives an oil which is isolated by extraction with ethyl acetate. From this oil, 2-methoxy-5-carbobenzoxyaminovaleric acid is obtained as white crystals having a melting point of 63°–65° C., by crystallization from benzene-petroleum ether. This compound is soluble in all common solvents except water and petroleum ether.

To a solution of 83 parts by weight of 2-methoxy-5-carbobenzoxyaminovaleric acid in 200 parts by volume of acetyl chloride there is added 67 parts by weight of phosphorus pentachloride in portions over a period of seven minutes. Hydrogen chloride is evolved and the reaction is slightly exothermic. After standing for twenty-three minutes more, the solution is evaporated to dryness in vacuo (bath 50° C.). After the addition of 200 parts by volume of toluene, the evaporation is repeated (bath 50° C.). The residual acid chloride, dissolved in 200 parts by volume of toluene, is condensed with 141 parts by volume of ethyl malonate and 66.2 parts by weight of magnesium methoxide in 300 parts by volume of toluene. The mixture is treated with 59 parts by volume of acetic acid and 230 parts by volume of 3 N hydrochloric acid. The separated toluene layer is washed with water and evaporated to dryness in vacuo. The residual oil is dissolved in 200 parts by volume of toluene and 500 parts by volume of heptane, then extracted three times with ice-cold 3% sodium hydroxide. Acidification given an oil which is isolated by extraction with ethyl acetate. This ethyl (2-methoxy-5-carbobenzoxyaminovaleryl)malonate is readily soluble in most solvents except water and petroleum ethers. It is also soluble in aqueous sodium hydroxide.

A solution of 25 parts by weight of ethyl (2-methoxy-5-carbobenzoxyaminovaleryl)malonate in 75 parts by volume of acetic acid is shaken with 5 parts by weight of activated carbon (Norit) for ten minutes. The mixture is filtered and the activated carbon (Norit) washed with 25 parts by volume of acetic acid. The filtrate is shaken with hydrogen in the presence of 5 parts by weight of 10% palladium charcoal for about one hour to obtain approximately a 70% uptake of one mole-equivalent of hydrogen. Then, .5 part by weight of platinum oxide catalyst is added and the hydrogenation continued for an additional three hours. The catalysts are removed by filtration and the filtrate is evaporated to dryness in vacuo. The resulting crude 3-methoxy-piperidine-2-malonic ester is refluxed with 128 parts by volume of 6 N hydrochloric acid for two hours. The solution is evaporated to dryness in vacuo. The residual gum is dissolved in 42 parts by volume of water, cooled in an ice-bath with stirring and treated with 74 parts by volume of 10% sodium hydroxide. When the temperature returns to about 6° C. a solution of 6.2 parts by volume of ethyl chlorocarbonate in 30 parts by volume of toluene is added over a period of ten minutes. After being stirred fifteen minutes more, 50 parts by volume of 10% sodium hydroxide is added followed by the dropwise addition of 6.2 parts by volume of ethyl chlorocarbonate in 30 parts by volume of toluene. The solution is stirred one hour more in the ice-bath, then extracted with ethyl acetate. The aqueous layer is acidified and extracted with chloroform. The combined extracts are evaporated to dryness in vacuo to obtain a yield of about 5 parts by weight of a viscous oil. This 1-carbethoxy-3-methoxy-2-piperidylacetic acid is slightly soluble in water, soluble in alcohol, acetone and benzene, but insoluble in petroleum ether.

To a solution of 5.3 parts by weight of 1-carbethoxy-3-methoxypiperidine-2-acetic acid in 25 parts by volume of acetyl chloride there is added 5.1 parts by weight of phosphorus pentachloride. After twenty minutes solvent is removed in vacuo (bath 45°–50° C.), then 37 parts by volume of toluene is added and the evaporation repeated. The residual acid chloride dissolved in 33 parts by volume of benzene is added dropwise to an ice-cooled solution of ethereal diazomethane (prepared from 13 parts by weight of nitrosomethylurea) over a period of seven minutes. After ten minutes more in the ice-bath, the solution is allowed to stand at room temperature for seventeen hours. The excess diazomethane is destroyed by the addition of 7.8 parts by volume of acetic acid. Then 24 parts by volume of 30% hydrobromic acid in acetic acid is gradually added with ice-cooling. After an additional five minutes the solution is washed twice each with water, excess aqueous sodium bicarbonate and water. The solution is evaporated to dryness in vacuo to obtain a yield of about 5 parts by weight of a light brown oil of 1-carbethoxy-2-(γ-bromoacetonyl)-3-methoxypiperidine which is readily soluble in organic solvents except petroleum ether and is also insoluble in water.

To a solution of 2.15 parts by weight of 4-quinazolone in 15 parts by volume of a 1 N methanol solution of sodium methoxide there is added a solution of 5.1 parts by weight of 1-carbethoxy-2-(gamma-bromoacetonyl)-3-methoxy-piperidine in 51 parts by volume of methanol. After one hour at room temperature the solution is diluted with 205 parts by volume of ice water and 82 parts by volume of 10% sodium hydroxide. A gum separates which is removed by extraction with chloroform. The combined extracts are evaporated to dryness in vacuo. The residue is crystallized from benzene-heptane. Recrystallization from the same solvents gives white crystals of 3-[beta-keto-gamma-(1-carbethoxy-3-methoxy-2-piperidyl)propyl]-4-quinazolone having a melting point of 138°–140° C. This compound is readily soluble in alcohol, acetone, benzene, chloroform, or ethyl acetate, but insoluble in petroleum ether or water.

*Example III*

By the condensation of 2.1 parts by weight of 6-chloro-4-quinazolone (J. Am. Chem. Soc., 68, 1304) in 12 parts by volume of a 1 N methanol solution of sodium methoxide with 1-carbethoxy-2-(gamma-bromoacetonyl)-3-methoxypiperidine by the same procedure as employed in Example II there is obtained 3-[beta-keto-gamma-(1-carbethoxy-3-methoxy-2-piperidyl)propyl]-6-chloro-4-quinazolone having a melting point of about 124°–125° C. This compound forms white crystals readily soluble in alcohol, acetone, ethyl acetate, chloroform or benzene, but insoluble in water or petroleum ether.

Example IV

By the condensation of 1.34 parts by weight of 6-methyl-4-quinazolone (Ber., 34, 3776) in 8.8 parts by volume of a 1 N methanol solution of sodium methoxide with 2.9 parts by weight of 1-carbethoxy-2-(gamma-bromo-acetonyl)-3-methoxypiperidine according to the procedure of Example II there is obtained about 1 part by weight of white crystals of 3-[beta-keto-gamma-(1-carbethoxy-3-methoxy-2-piperidyl)propyl]-6-methyl-4-quinazolone, having a melting point of 113°–115° C. This compound is insoluble in water or petroleum ether, but soluble in alcohol, chloroform, benzene or acetone.

Example V

By the condensation of 1.86 parts by weight of 6-methoxy-4-quinazolone (J. Am. Chem. Soc., 68, 1302) in 11 parts by volume of a 1 N methanol solution of sodium methoxide with 3.6 parts by weight of 1-carbethoxy-2-(gamma-bromoacetonyl)-3-methoxypiperidine according to the procedure of Example II there is obtained white crystals of 3-[beta-keto-gamma-(1-carbethoxy-3-methoxy-2-piperidyl)-propyl]-6-methoxy-4-quinazolone having a melting point of about 102°–103° C. This compound is soluble in alcohol, acetone, chloroform or benzene, but insoluble in water or petroleum ether.

Example VI

A stirred solution of 49.5 parts by weight of 7-chloroisatin (Helv. chim. acta, 2, 239) in 485 parts by volume of 5% sodium hydroxide is treated with 73 parts by volume of 30% hydrogen peroxide over a period of twenty minutes. The solution is stirred twenty minutes longer, clarified with activated carbon (Norit) and acidified to obtain a yield of about 36 parts by weight of 3-chloroanthranilic acid having a melting point of 187°–188° C.

A mixture of 35.2 parts by weight of 3-chloroanthranilic acid and 31 parts by volume of formamide is heated at 130°–135° C. for forty-five minutes and at 175° C. for seventy-five minutes. Addition of 50 parts by volume of 2-methoxyethanol and 500 parts by volume of water gives 31 parts by weight of 8-chloro-4-quinazolone which forms on recrystallization from 2-methoxyethanol, white crystals having a melting point of 299°–300° C.

By condensation of 1.7 parts by weight of 8-chloro-4-quinazolone in 9.8 parts by volume of a 1 N methanol solution of sodium methoxide with 3.2 parts by weight of 1-carbethoxy-2-(gamma-bromoacetonyl)-3-methoxy-piperidine according to the procedure of Example II there is obtained 1.09 parts by weight of white crystals having a melting point of 153°–154° C. of 3-[beta-keto-gamma-(1-carbethoxy-3-methoxy-2-piperidyl)propyl]-8-chloro-4-quinazolone. This compound is soluble in acetone, chloroform or benzene, but insoluble in water or petroleum ether.

Example VII

By condensation of 1.6 parts by weight of 8-methyl-4-quinazolone (Ber., 38, 3555) in 10.5 parts by volume of a 1 N methanol solution of sodium methoxide with 3.45 parts by weight of 1-carbethoxy-2-(gamma-bromoacetonyl)-3-methoxypiperidine according to the procedure of Example II there is obtained 0.965 part by weight of 3-[beta-keto-gamma-(1-carbethoxy-3-methoxy-2-piperidyl)propyl]-8-methyl-4-quinazolone as white crystals having a melting point of 143°–145° C. This compound is insoluble in water or petroleum ether, but soluble in chloroform, ethyl acetate, alcohol or benzene.

Example VIII

By condensation of 1.94 parts by weight of 7-chloro-4-quinazolone (J. Am. Chem. Soc., 69, 184) in 11 parts by volume of a 1N methanol solution of sodium methoxide with 3.65 parts by weight of 1-carbethoxy-2-(gamma-bromoacetonyl)-2-methoxy-piperidine according to the procedure of Example II there is obtained 3-[beta-keto-gamma-(1-carbethoxy-3-methoxy-2-piperidyl)propyl]-7-chloro-4-quinazolone as white crystals having a melting point of 125°–126° C. This compound is insoluble in water or petroleum ether, but soluble in methanol, chloroform or benzene.

Example IX

A solution of 11.8 parts by weight of 4-chloro-7-methoxyisatin (Helv. chim. acta, 2, 239) in 100 parts by volume of 5% sodium hydroxide is treated with 15 parts by volume of 30% hydrogen peroxide over a period of ten minutes. After ten minutes more the solution is clarified with activated carbon (Norit) and neutralized with hydrochloric acid. The 3-methoxy-6-chloroanthranilic acid crystallizes, which after recrystallization from aqueous methanol has a melting point of 145°–146° C.

A mixture of 2.4 parts by weight of 3-methoxy-6-chloro-anthranilic acid and 1 part by volume of formamide is fused in the same manner as described for 8-chloro-4-quinazolone in Example VI. The resulting 5-chloro-8-methoxy-4-quinazolone forms white crystals from 2-methoxyethanol having a melting point with decomposition of 311°–313° C.

By condensation of 1.8 parts by weight of 5-chloro-8-methoxy-4-quinazolone in 9.4 parts by volume of 1 N methanolic sodium methoxide and 15 parts by volume of 2-methoxyethanol with 3.1 parts by weight of 1-carbethoxy-2-(gamma-bromoacetonyl)-3-methoxypiperidine in 31 parts by volume of methanol according to the procedure of Example II, there is obtained 0.65 part by weight of white crystals of 3-[beta-keto-gamma-(1-carbethoxy-3-methoxy-2-piperidyl)-propyl]-5-chloro-8-methoxy-4-quinazolone.

Example X

By condensing 1.85 parts by weight of 5-methyl-4-quinazolone (Ber., 52, 1084) in 12 parts by volume of a 1 N methanol solution of sodium methoxide with 4 parts by weight of 1-carbethoxy-2-(gamma-bromoacetonyl)-3-methoxypiperidine according to the procedure of Example II there is obtained approximately 4 parts by weight of 3-[beta-keto-gamma-(1-carbethoxy-3-methoxy-2-piperidyl)-propyl]-5-methyl-4-quinazolone as a gum.

Example XI

By fusion of 12.6 parts by weight of 6-chloroanthranilic acid (Monats., 22, 488) with 11 parts by volume of formamide according to the procedure employed in Example VI, there is obtained approximately 10 parts by weight of tan crystals of 5-chloro-4-quinazolone, which after recrystallization from aqueous 2-methoxyethanol, have a melting point of about 210° C.

By condensing 2.1 parts by weight of 5-chloro-4-quinazolone in 12 parts by volume of a 1 N methanol solution of sodium methoxide according to the procedure of Example II, there is obtained 3-[beta-keto-gamma-(1-carbethoxy-3-methoxy-2-piperidyl)propyl]-5-chloro-4-quinazolone as a gum.

Example XII

To a solution of 65.7 parts by weight of ethyl phenoxymalonate (J. Am. Chem. Soc., 62, 1155) in 66 parts by volume of t-buytl alcohol there is added 0.6 part by weight of sodium methoxide and 15.4 parts by volume of acrylonitrile. After ten minutes, the mixture is heated at 100° C. under a condenser for about one hour, then acidified with 2 parts by volume of acetic acid, washed with water and distilled. The product, ethyl cyanoethyl phenoxymalonate, is a colorless oil having a boiling point of 158° C. (0.1 mm.). This compound is soluble in alcohol, acetone, carbon tetrachloride or toluene, but is insoluble in water.

A mixture of 60 parts by weight of ethyl cyanoethyl phenoxymalonate and 120 parts by volume of diethyl carbitol is shaken with hydrogen at 2-3 atmospheres in the presence of Raney nickel at 100° C. for about fifteen hours during which time two mol-equivalents of hydrogen are absorbed. The filtered solution is evaporated at 10 mm. up to a bath temperature of 130° C. The residue is an oil of 3-carbethoxy-3-phenoxy-2-piperidone.

The 3-carbethoxy-3-phenoxy-2-piperidone is converted to 3-[beta-keto-gamma-(1-carbethoxy-3-phenoxy-2-piperidyl)propyl]-4-quinazolone in the same manner that 3-carbomethoxy-3-methoxy-2-piperidone is converted to 3-[beta-keto-gamma-(1-carbethoxy-3-methoxy-2-piperidyl)propyl]-4-quinazolone in Example II. This compound is an oil soluble in alcohol, chloroform or ethyl acetate, but insoluble in water, or petroleum ether.

Example XIII

A mixture of 5 parts by weight of nipecotic acid hydrochloride, 100 parts by volume of 1 N sodium hydroxide and 7 parts by weight of 3,5-dinitrobenzoyl chloride is shaken for about ten minutes, filtered, acidified hot with acetic acid, cooled and filtered. Recrystallization from aqueous 2-methoxy-ethanol gives white leaflets of 1-(3,5-dinitrobenzoyl) piperidyl-3-carboxylic acid having a melting point of about 225°-226° C.

A mixture of 5.4 parts by weight of 1-(3,5-dinitrobenzoyl)piperidyl-3-carboxylic acid, 16 parts by volume of reagent ether (containing 0.5% pyridine) and 32 parts by volume of thionyl chloride is shaken for about thirty-five minutes, filtered and evaporated. The residual acid chloride, dissolved in 50 parts by volume of benzene, is added to an ethereal solution of diazomethane (from 8 parts by weight of nitrosomethylurea) with cooling. The mixture is stirred about one hour, then the crystalline 1-(3,5-dinitrobenzoyl)-3-diazoacetylpiperidine is collected on a filter. Recrystallization from absolute alcohol gives pink crystals having a melting point with decomposition, of 110°-112° C.

A mixture of 3.5 parts by weight of 1-(3,5-dinitrobenzoyl)-3-diazoacetylpiperidine, 35 parts by volume of absolute alcohol and 7 parts by volume of absolute alcohol saturated with hydrogen chloride is heated to boiling, then cooled. Pink crystals of 1-(3,5-dinitrobenzoyl)-3-chloroacetylpiperidine separate on cooling having a melting point, with decomposition, of 125°-127° C. after recrystallization from absolute alcohol.

To a solution of 1.0 part by weight of 1-(3,5-dinitrobenzoyl)-3-chloroacetylpiperidine in 15 parts by volume of 2-methoxyethanol there is added a solution of 0.41 part by weight of 4-quinazolone in 2.8 parts by volume of a 1 N methanol solution of sodium methoxide. During fifteen hours at room temperature the solution deposits white crystals of 3-[beta-keto-beta-(N-3,5-dinitrobenzoyl-3-piperidyl)ethyl]-4-quinazolone melting, with decomposition, at about 230°-233° C. This compound is soluble in hot 2-methoxyethanol but insoluble in most solvents cold.

Example XIV

A mixture of 2 parts by weight of 1-benzoyl-3-carbomethoxy-4-piperidol (J. Am. Chem. Soc., 68, 1049) and 6 parts by volume of 10% sodium hydroxide is heated on a steam-bath for four minutes, then acidified, saturated with salt and extracted with ethyl acetate. The dried extracts are concentrated and cooled to obtain white crystals of 1-benzoyl-3-carboxy-4-piperidol having a melting point of 162°-164° C.

A solution of 2 parts by weight of 1-benzoyl-3-carboxy-4-piperidol in 10 parts by volume of acetic anhydride is heated at 100° C. for one hour, then 10 parts by volume of water is added and the heating continued for ten minutes. The solution is evaporated to dryness in vacuo. Crystallization of the residue from benzene-petroleum ether gives white crystals of 1-benzoyl-3-acetoxy-piperidyl-3-carboxylic acid having a melting point of 193°-195° C.

A mixture of 4.9 parts by weight of 1-benzoyl-4-acetoxypiperidyl-3-carboxylic acid, 29 parts by volume of acetyl chloride and 3.9 parts by weight of phosphorus pentachloride is allowed to react for fifteen minutes. The residual acid chloride, dissolved in 36 parts by volume of dimethyl Cellosolve is added to a cooled solution of ethereal diazomethane (from 9 parts by weight of nitrosomethylurea). After about one hour at room temperature, 3.6 parts by volume of acetic acid are added followed by 17.5 parts by volume of 30% hydrogen bromide in acetic acid. The mixture, after washing with water, aqueous sodium bicarbonate and water is evaporated to dryness. Trituration of the residue with ethyl acetate gives a solid which is recrystallized from methanol to give about 4 parts by weight of 1-benzoyl-3-bromacetyl-4-acetoxypiperidine as an oil.

To a solution of 0.2 part by weight of 4-quinazolone in 1.4 parts by volume of a 1 N methanol solution of sodium methoxide there is added 0.58 part by weight of 1-benzoyl-3-bromoacetyl-4-acetoxypiperidine in 3.3 parts by volume of methanol. After twenty-five minutes 1.4 parts by volume of 1 N sodium methoxide are added and the solution refluxed for ten minutes to complete the reaction. The solution is diluted with several volumes of water, made basic with sodium hydroxide solution and extracted with chloroform. Evaporation of the extracts and recrystallization of the residue from absolute alcoholic hydrogen chloride gives white crystals of 3-[beta-keto-beta-(1-benzoyl-4-hydroxy-3-piperidyl)ethyl]-4-quinazolone hydrochloride having a melting point, with decomposition, of 190°-192° C. This compound is soluble in hot methanol or ethanol but insoluble in acetone, ether, benzene or cold ethanol.

Example XV

A mixture of 8 parts by weight of 3,5-dinitrobenzoylproline (J. Chem. Soc., 1938, 1397), 40 parts by volume of acetyl chloride and 5.5 parts by weight of phosphorus pentachloride is gently warmed until solution takes place. After standing ten minutes more the solution is evaporated to dryness in vacuo. The evaporation is repeated after adding toluene. The residual acid chloride, dissolved in 50 parts by volume of dimethyl Cellosolve is added to a cooled solution of ethereal diazomethane (from 12.5 parts by weight of nitrosomethylurea). After about one hour at room temperature, 5 parts by volume of acetic acid are added followed by 24 parts by volume of 30% hydrogen bromide in acetic acid. The mixture, after washing with water, aqueous sodium bicarbonate and water is evaporated to dryness. Trituration of the residue with ethyl acetate gives a solid which is recrystallized from methanol to give yellow crystals of 1-(3,5-dinitrobenzoyl)-2-bromacetyl-pyrrolidine having a melting point of 110°–112° C.

To a solution of .105 part by weight of sodio-quinazolone in 5 parts by volume of 2-methoxyethanol cooled to −15° C. there is added a similarly cooled solution of .25 parts by weight of 1 - (3,5 - dinitrobenzoyl) - 2 - bromoacetylpyrrolidine in 5 parts by volume of 2-methoxyethanol. After forty-two hours at −3° C., the solution is evaporated to dryness in vacuo and the residue crystallized from methanol. Recrystallization from aqueous 2-methoxyethanol gives white crystals of 3-[beta-keto-beta-(N-3,5-dinitrobenzoyl - 2 - pyrrolidyl)ethyl] - 4 - quinazolone having a melting point, with decomposition, of 215°–217° C. This compound is soluble in warm 2-methoxyethanol, insoluble in water, methanol, benzene or petroleum ether.

Example XVI

A mixture of 4.4 parts by weight of benzoylproline, 22 parts by volume of acetyl chloride and 4.4 parts by weight of phosphorus pentachloride is allowed to stand twenty minutes. The acid chloride formed is converted to 1-benzoyl-2-bromoacetylpyrrolidine with diazomethane, then hydrogen bromide as in Example XV. The product is an oil soluble in methanol, acetone, chloroform and ethyl acetate, but insoluble in water.

To a solution of .2 part by weight of 4-quinazolone in 1.4 parts by volume of a 1 N methanol solution of sodium methoxide there is added a solution of 0.47 part by weight of 1-benzoyl-2-bromoacetylpyrrolidine in 4.7 parts by volume of methanol. After four hours the solution is diluted with several volumes of water, made basic with sodium hydroxide solution and extracted with chloroform. Evaporation of the extracts gives an oil which forms, from absolute alcoholic hydrogen chloride, white crystals of 3-[beta-keto-beta - (1 - benzoyl - 2 - pyrrolidyl)ethyl] - 4-quinazolone hydrochloride having a melting point, with decomposition, of 200°–202° C. This compound is soluble in methanol or ethanol, but insoluble in acetone, ether or petroleum ether.

Example XVII

A mixture of 164 parts by weight of phthalimidoacetone, 25.5 parts by weight of ammonium acetate, 73 parts by volume of acetic acid, 100 parts by volume of ethyl cyanoacetate and 500 parts by volume of benzene is refluxed under a constant water separator for ten hours, then washed with water and evaporated to dryness in vacuo. Crystallization from alcohol gives about 160 parts by weight of tan crystals of ethyl 2-cyano - 3 - methyl - 4 - phthalimido - 2 - butenoate having a melting point of 93°–103° C. A pure isomer may be obtained as white crystals, having a melting point of 117°–120° C., by further recrystallization from alcohol.

A solution of 162 parts by weight of ethyl 2-cyano - 3 - methyl - 4 - phthalimido - 2 - butenoate in 570 parts by volume of 2-methoxyethanol is shaken with hydrogen at 2–3 atmospheres in the presence of 0.8 part by weight of platinum oxide until one mol-equivalent of hydrogen is absorbed (about two hours). The filtered solution is evaporated to dryness in vacuo. The residue is dissolved in 400 parts by volume of ethyl acetate, washed with 120 parts by volume of 1 N hydrochloric acid, and then with water. Evaporation gives about 155 parts by weight of an oil of ethyl 2-cyano-3-methyl-4-phthalimidobutyrate.

A mixture of 157 parts by weight of ethyl 2-cyano - 3 - methyl - 4 - phthalimidobutyrate and 1000 parts by volume of 6 N hydrochloric acid is refluxed for eleven hours, cooled, filtered from phthalic acid and evaporated to dryness in vacuo. The residue is dissolved in 400 parts by volume of water and the solution clarified by filtration through diatomaceous earth (Celite), using 200 parts by volume of water to wash. The combined filtrate and washings are treated with 99 parts by weight of sodium hydroxide in 440 parts by volume of water and concentrated to about one-third the original volume in vacuo to remove ammonia. Make-up water is added to obtain the original volume. To this solution cooled in an ice-bath, there is added 164 parts by volume of benzyl chlorocarbonate. The mixture is stirred an additional forty minutes, washed with ethyl acetate and the alkaline aqueous layer acidified. The oil which separates is extracted with ethyl acetate, washed with water and the extract evaporated to dryness in vacuo to yield an oil of 3-methyl-4-carbobenzoxyaminobutyric acid. This acid forms an anilide as white crystals having a melting point of 131°–132° C.

A solution of 86 parts by weight of 3-methyl-4-carbobenzoxyaminobutyric acid in 172 parts by volume of reagent ether (containing 0.5% pyridine) is cooled to −30° C. in an acetone-Dry Ice bath. Then 29 parts by volume of thionyl chloride is added maintaining the temperature at −23° to −30° C. After thirty minutes at −23° C., volatile material is removed in vacuo from a bath at −23° C. The residual acid chloride, dissolved in 220 parts by volume of toluene at −30° C. is added to a stirred solution of 77 parts by weight of magnesium methoxide and 164 parts by volume of ethyl malonate in 320 parts by volume of toluene over a period of forty-five minutes. The mixture is stirred fifteen minutes longer, acidified with 68 parts by volume of acetic acid and washed with dilute hydrochloric acid, then water. The ethyl(3 - methyl - 4 - carbobenzoxyaminobutyryl)malonate is isolated as an oil by alkaline extraction as described for ethyl (2-methoxy-5-carbobenzoxyaminovaleryl) malonate in Example II.

By hydrogenation of 27 parts by weight of ethyl (3-methyl-4-carbobenzoxyaminobutyryl)-malonate in 125 parts by volume of acetic acid followed by hydrolysis and carbethoxylation as described in Example II there is obtained 6.8 parts by weight of 1-carbethoxy-4-methylpyrrolidyl-2-acetic acid as an oil which is soluble in alcohol, chloroform or ethyl acetate, but insoluble in water or petroleum ether.

Approximately 5.6 parts by weight of 1-carbethoxy - 4 - methylpyrrolidyl-2-acetic acid are converted to the acid chloride with 5.9 parts by weight of phosphorus pentachloride. By treatment of the acid chloride with diazomethane and hydrogen bromide as described in Example II there is isolated about 3.6 parts by weight of 1-carbethoxy - 2 - (gamma - bromoacetonyl)-4-methylpyrrolidine as an oil soluble in alcohol, benzene or ether, but insoluble in water.

To a solution of 1.6 parts by weight of 4-quinazolone in 11.4 parts by volume of a 1 N methanol solution of sodium methoxide there is added a solution of 3.6 parts by weight of 1-carbethoxy - 2 - (gamma - bromoacetonyl)-4-methylpyrrolidine. White crystals of 3-[beta-keto-gamma - (1 - carbethoxy-4-methyl-2-pyrrolidyl) propyl]-4-quinazolone having a melting point of 123°–124° C. are isolated by the procedure of Example II. This compound is soluble in alcohol, acetone, chloroform or benzene, but insoluble in water or petroleum ether.

*Example XVIII*

A mixture of 80.5 parts by weight of methyl hydrogen itaconate (Ber., 30, 2651), 80 parts by volume of methanol and 0.2 part by weight of platinum oxide is shaken with hydrogen at 2–3 atmospheres until reduction is complete (about one hour). The filtered solution is evaporated to dryness in vacuo. To the residual oily methyl hydrogen methylsuccinate there is added 45 parts by volume of reagent ether (containing 0.5% pyridine) and 57 parts by volume of thionyl chloride. The mixture is refluxed for twenty minutes, then distilled. Beta-carbomethoxyisobutyryl chloride is obtained as a nearly colorless oil, having a boiling point of 84°–86° C. (11 mm.) which gives white crystals of an N-methylanilide having a melting point of 100°–101° C. when treated with methylaniline.

To a stirred solution of 80 parts by weight of magnesium methoxide and 165 parts by volume of ethyl malonate in 480 parts by volume of toluene there is added a solution of 87.7 parts by weight of beta-carbomethoxyisobutyryl chloride in 330 parts by volume of toluene over a period of forty minutes. After being stirred an additional fifteen minutes, the mixture is acidified with 57 parts by volume of acetic acid and washed with dilute hydrochloric acid, then water. Distillation gives about 131 parts by weight of ethyl (beta - carbomethoxyisobutyryl)malonate as a colorless oil having a boiling point of 123° C. (0.1 mm.) which gives a red ferric chloride test.

A mixture of 120 parts by weight of ethyl (beta-carbomethoxyisobutyryl)malonate and 600 parts by volume of water is refluxed for two hours. Fractional distillation of the insoluble oil gives about 51 parts by weight of ethyl (beta-carbomethoxyisobutyryl)acetate as a colorless oil having a boiling point of 100°–101° C. (0.1 mm.).

A mixture of 29.2 parts by weight of ethyl (beta-carbomethoxyisobutyryl)acetate, 80 parts by volume of benzene and 16.5 parts by volume of benzylamine is refluxed under a constant water separator for two hours. After the addition of 80 parts by volume of absolute alcohol and 8.5 parts by weight of sodium methoxide, the solution is refluxed ten minutes, acidified with 10 parts by volume of acetic acid, washed with water and evaporated. The residue is an orange oil of ethyl 1-benzyl-3-methyl-5-oxo-2-pyrroline-2-acetate.

To a refluxing solution of 10 parts by weight of lithium aluminum hydride in 150 parts by volume of dry ether there is added a solution of 32 parts by weight of ethyl 1-benzyl-3-methyl-5-oxo-2-pyrroline-2-acetate in 130 parts by volume of dry ether over a period of ten minutes. The mixture is refluxed for forty-five minutes, then treated successively with 30 parts by volume of ethyl acetate, 30 parts by volume of water and 150 parts by volume of 10% sodium hydroxide. The organic layer is decanted from the sludge and the latter rinsed with benzene. The combined organic solutions are dried and evaporated. Distillation of the residue gives about 14 parts by weight of 1-benzyl-3-methylpyrrolidyl-2-ethanol as a yellow oil having a boiling point of 115°–125° C. (0.1 mm.). This compound is insoluble in water, but soluble in benzene, ether, chloroform or aqueous acid.

A mixture of 40.6 parts by weight of 1-benzyl-methylpyrrolidyl-2-ethanol, 100 parts by volume of acetic acid and 6 parts by weight of 10% palladium charcoal is shaken with hydrogen at 2–3 atmosphere until reduction is complete (about three hours.) To the filtered solution there is added 24 parts by volume of 12 N hydrochloric acid. Evaporation to dryness in vacuo gives a gum which is dissolved in 20 parts by volume of water, made basic with potassium carbonate and extracted with chloroform. Distillation of the extracts gives 3-methylpyrrolidyl-2-ethanol as a colorless oil having a boiling point of 100°–113° C. (10 mm.), which is soluble in water, alcohol, chloroform or benzene, but insoluble in petroleum ether. It has a piperidine-like odor.

A solution of 14.9 parts by weight of 3-methylpyrrolidyl-2-ethanol in 740 parts by volume of water containing 37 parts by volume of 96% sulfuric acid and 23.2 parts by weight of chromium trioxide is allowed to stand sixteen hours. After the addition of a hot solution of 270 parts by weight of barium hydroxide in 500 parts by volume of water, the mixture is digested on a steam-bath for twenty minutes, then filtered and concentrated to about 400 parts by volume. The excess barium is removed by addition of carbon dioxide and the filtered solution evaporated to dryness in vacuo leaving about 12 parts by weight of 3-methylpyrrolidyl-2-acetic acid as a light yellow gum, soluble in water or alcohol, but insoluble in ether, benzene or petroleum ether.

To a stirred solution of 12.5 parts by weight of 3-methylpyrrolidyl-2-acetic acid in 124 parts by volume of 5% sodium hydroxide cooled in an ice-bath there is added a solution of 8.3 parts by volume of ethyl chloroformate in 33 parts by volume of toluene over a period of twenty minutes. After ten minutes more the mixture is treated with 62 parts by volume of 10% sodium hydroxide and 8.3 parts by volume of ethyl chloroformate in 33 parts by volume of toluene. The mixture is stirred one hour more. The separated aqueous layer is acidified and extracted with chloroform. Evaporation of the extracts gives about 11 parts by weight of 1-carbethoxy-3-methylpyrrolidyl-2-acetic acid as a nearly colorless viscous oil soluble in alcohol, chloroform or benzene, but insoluble in water or petroleum ether.

Treatment of 5.6 parts by weight of 1-carbethoxy-3-methylpyrrolidyl-2-acetic acid with 5.9 parts by weight of phosphorus pentachloride, then with diazomethane and hydrogen bromide according to the procedure of Example II, gives about 7 parts by weight of 1-carbethoxy-2-(gamma-bromoacetonyl)-3-methyl-pyrrolidine as a yellow oil soluble in chloroform, ether, alcohol or benzene, but insoluble in water.

To a solution of 3.3 parts by weight of 4-quinazolone in 23.5 parts by volume of a 1 N methanol solution of sodium methoxide there is added a solution of 7.4 parts by weight of 1-carbethoxy-2 - (gamma-bromoacetonyl) - 3 - methylpyrrolidine in 74 parts by volume of methanol. White crystals of 3-[beta-keto-gamma-(1-carbethoxy-3 - methyl - 2 - pyrrolidyl)propyl] - 4 - quinazolone having a melting point of 149°–150° C. are isolated according to the procedure of Example II. This compound is soluble in benzene, chloroform or acetone, but insoluble in water or petroleum ether.

*Example XIX*

A solution of 80.5 parts by weight of dimethyl methoxymethylsuccinate (J. Am. Chem. Soc., 59, 751) in 480 parts by volume of 6 N hydrochloric acid is allowed to stand for three hours, then partially neutralized with 100 parts by weight of anhydrous potassium carbonate and diluted with just sufficient water to dissolve the salts. The solution is extracted with chloroform and the combined extracts distilled. Alpha-methyl hydrogen methoxymethylsuccinate is obtained as a colorless oil having a boiling point of 130°–132° C. (0.3 mm.). This compound is soluble in water, chloroform or benzene, but insoluble in petroleum ether.

Alpha-methyl hydrogen methoxymethylsuccinate is converted to 1-carbethoxy-4-methoxymethylpyrrolidyl-2-acetic acid, a yellow viscous oil, in the same manner that methyl hydrogen methylsuccinate is converted to 1-carbethoxy-3-methyl-pyrrolidyl - 2 - acetic acid in Example XVIII.

By treatment of 6 parts by weight of 1-carbethoxy - 4 - methoxymethylpyrrolidyl - 2 - acetic acid with 5.7 parts by weight of phosphorus pentachloride followed by diazomethane and hydrogen bromide according to the procedure of Example II there is obtained 7.3 parts by weight of 1-carbethoxy-2-(gamma-bromoacetonyl)-4-methoxymethylpyrrolidine as a yellow oil soluble in alcohol, benzene or ether, but insoluble in water.

To a solution of 3 parts by weight of 4-quinazolone in 21 parts by volume of a 1 N methanol solution of sodium methoxide there is added a solution of 7.3 parts by weight of 1-carbethoxy-2 - (gamma - bromoacetonyl) - 4 - methoxymethylpyrrolidine in 73 parts by volume of methanol. White crystals of 3-[beta-keto-gamma-(1 - carbethoxy - 4 - methoxymethyl - 2 - pyrrolidyl)propyl]-4-quinazolone having a melting point of 100°–102° C. are isolated according to the procedure of Example II. This compound is soluble in chloroform, benzene or alcohol, but insoluble in water or petroleum ether.

*Example XX*

To a hot solution of 300 parts by weight of methoxymethylsuccinic acid (J. Am. Chem. Soc., 59, 751) in 300 parts by volume of methanol there is added 4.8 parts by volume of acetyl chloride. After refluxing for twenty minutes, the solvent is removed in vacuo and the residue fractionally distilled to give 204 parts by weight of (beta)-methyl hydrogen methoxymethylsuccinate as a colorless oil having a boiling point of 123°–135° C. (0.5–1 mm.). This monoester is converted to 1-carbethoxy-3-methoxymethylpyrrolidyl-2-acetic acid, a viscous yellow oil, in the same fashion that methyl hydrogen methylsuccinate is converted to 1-carbethoxy-3-methyl-pyrrolidyl-2-acetic acid in Example XVIII.

By treatment of 7.8 parts by weight of 1-carbethoxy - 3 - methoxymethylpyrrolidyl - 2 - acetic acid with 7.4 parts by weight of phosphorus pentachloride, then with diazomethane and hydrogen bromide according to the procedure in Example II there is obtained about 9 parts by weight of 1-carbethoxy-2-(gamma-bromo- acetonyl)-3-methoxymethylpyrrolidine as an oil soluble in chloroform, benzene or ether, but insoluble in water.

To a solution of 3.65 parts by weight of 4-quinazolone in 26 parts by volume of a 1 N methanol solution of sodium methoxide there is added a solution of 9 parts by weight of 1-carbethoxy-2 - (gamma - bromoacetonyl) - 3 - methoxymethylpyrrolidine. White crystals of 3-[beta-keto - gamma - (1 - carbethoxy - 3 - methoxymethyl-2-pyrrolidyl)propyl]-4-quinazolone having a melting point of 94°–96° C., are isolated according to the procedure of Example II. This compound is soluble in alcohol, chloroform or benzene, but insoluble in water or petroleum ether.

*Example XXI*

Example XX is repeated but employing 4.54 parts by weight of 6-chloro-4-quinazolone (J. Am. Chem. Soc., 68, 1302) in place of the 4-quinazolone of that example. 3-[beta-keto-gamma-(1 - carbethoxy - 3 - methoxymethyl - 2 - pyrrolidyl)propyl]-6-chloro-4-quinazolone is obtained in equally good yield.

*Example XXII*

In place of the 4-quinazolone of Example XX, there is employed 3.9 parts by weight of 8-methyl-4-quinazolone (Ber. 38, 3555). 3-[beta-keto-gamma (1 - carbethoxy - 3 - methoxymethyl - 2 - pyrrolidyl)propyl] - 8 - methyl - 4 - quinazolone is obtained in equally good yield.

*Example XXIII*

By condensing 4.4 parts by weight of 6-methoxy-4-quinazolone with 9 parts by weight of 1 - carbethoxy - 2 - (gamma - bromacetonyl) - 3 - methoxymethylpyrrolidine according to the procedure of Example XX, there is obtained 3 - [beta - keto - gamma - (1 - carbethoxy - 3 - methoxymethyl - 2 - pyrrolidyl)propyl] - 8 - methyl - 4 - quinazolone in equally good yield.

*Example XXIV*

Example XX is repeated but employing 5.28 parts by weight of 5-chloro-8-methoxy-4-quinazolone (prepared according to the procedure of Example IX) in place of the 4-quinazolone of Example XX, to obtain 3-[beta-keto-gamma-(1-carbethoxy-3-methoxymethyl-2- pyrrolidyl)propyl]-5-chloro-8-methoxy-4-quinazolone.

*Example XXV*

3-[beta-keto-gamma-(1-carbethoxy-3 - methoxymethyl-2-pyrrolidyl)propyl] - 5 - methyl - 4-quinazolone is prepared by the procedure of Example XX, using 3.9 parts by weight of 5-methyl-4-quinazolone (Ber., 52, 1084) in place of the 4-quinazolone of that example.

*Example XXVI*

A solution of 12.5 parts by weight of beta-2-furyl-beta-alanine (Posner, Ann., 389, 107) in 125 parts by volume of water is shaken with hydrogen in the presence of 200 parts by weight of platinum oxide catalyst until reduction is complete (about three hours). The filtered solution is evaporated to dryness in vacuo. The residue is dissolved in hot absolute alcohol, filtered and the filtrate evaporated. The residue of beta-2-tetra-hydrofuryl-beta-alanine is an oil.

A mixture of 9.3 parts by weight of beta-2-tetrahydrofuryl-beta-alanine and 8.7 parts by weight of phythalic anhydride is heated at 180° C. for thirty minutes. A solution of the melt in ethyl acetate is extracted with aqueous sodium bicarbonate. Acidification gives a gum which is extracted with chloroform. Evaporation of the combined dried extracts gives about 9 parts by weight of beta-2-tetrahydrofuryl-beta-phthalimidopropionic acid as an amber gum.

To a solution of 8.7 parts by weight of beta-2-tetra-hydrofuryl - beta - phythalimidopropionic acid in 34 parts by volume of acetyl chloride there is added 7.4 parts by weight of phosphorus pentachloride. After twenty mintues the solution is evaporated in vacuo, the residue dissolved in 52 parts by volume of benzene and the evaporation repeated. The residual acid chloride, dissolved in 45 parts by volume of benzene is added to an ethereal solution of diazomethane (from 20 parts by weight of nitrosomethylurea) with ice cooling. After twenty hours the mixture is treated with 10 parts by volume of acetic acid, then 33 parts by volume of 30% hydrogen bromide in acetic acid with cooling. Ten minutes later the mixture is washed successively with water, aqueous sodium bicarbonate and water. Evaporation of the organic layer gives about 8 parts by weight of an oil of 1-bromo-4-phthalimido-4-(2-tetrahydrofuryl)-2-butanone.

To a solution of 3 parts by weight of 4-quinazolone in 21 parts by volume of 1 N sodium methoxide there is added a solution of 8.1 parts by weight of 1-bromo-4-phthalimido-4-(2-tetrahydrofuryl)-2-butanone in 90 parts by volume of methoxyethanol. After one hour the solution is diluted with 290 parts by volume of iced water and 112 parts by volume of 10% sodium hydroxide, then extracted with chloroform. Evaporation of the combined extracts gives 3-[beta-keto-delta-phthalimido-delta - (2 - tetrahydrofuryl)-butyl]-4-quinazolone as a gum.

A solution of .53 part by weight of 3-[beta-keto-delta-phthalimido-delta - (2 - tetrahydrofuryl) butyl]-4-quinazolone in 3 parts by volume of 6 N hydrochloric acid is refluxed for four hours, then evaporated to dryness in vacuo. Crystallization from absolute alcoholic hydrogen chloride by the addition of acetone gives white crystals of 3-[beta-keto-delta-amino-delta-(2-tetrahydrofuryl) butyl]-4-quinazolone dihydrochloride monohydrate having a melting point of about 205°–206° C.

*Example XXVII*

Example XXVI is repeated but employing 3.22 parts by weight of 5-methyl-4-quinazolone (Ber. 52, 1084) in place of the 4-quinazolone of that example. There is obtained 3-[beta-keto-delta-amino-delta - (2 - tetrahydrofuryl) butyl] - 5-methyl-4-quinazolone dihydochloride monohydrate in equally good yield.

*Example XXVIII*

In place of the 4-quinazolone of Example XXVI, there is employed 3.73 parts by weight of 5-chloro-4-quinazolone (prepared by the procedure of Example XI). 3-[beta-keto-delta-amino-delta-(2-tetrahydrofuryl) butyl]-5 - chloro - 4-quinazolone dihydrochloride monohydrate is obtained in equally good yield.

*Example XXIX*

Example XXVI is repeated but employing 4.34 parts by weight of 5-chloro-8-methoxy-4-quinazolone (prepared according to the procedure of Example IX) in place of the 4-quinazolone of Example XXVI, to obtain 3-[beta-keto-delta-amino-delta-(2-tetrahydrofuryl) butyl]- 5 -chloro-8-methoxy - 4 - quinazolone dihydrochloride monohydrate.

*Example XXX*

3-[beta-keto-delta-amino-delta - (2 - tetrahydrofuryl) butyl]-6-methoxy-4-quinazolone dihydrochloride monohydrate is prepared by the procedure of Example XXVI, using 3.6 parts by weight of 6-methoxy-4-quinazolone (J. Am. Chem. Soc., 68, 1302) in place of the 4-quinazolone of that example.

*Example XXXI*

3-[beta-keto-delta-amino-delta-(2 - tetrahydrofuryl) -butyl]-8-chloro-4-quinazolone dihydrochloride monohydrate is prepared by the procedure of Example XXVI, using 3.7 parts by weight of 8-chloro-4-quinazolone (prepared by the procedure of Example VI in place of the 4-quinazolone of Example XXVI.

*Example XXXII*

3-[beta-keto-delta-amino-delta - (2 - tetrahydrofuryl) -butyl]-7-methyl-4-quinazolone dihydrochloride monohydrate is prepared by the procedure of Example XXVI, using 3.2 parts by weight of 7-methyl-4-quinazolone (J. prakt. Chem., (2), 51, 566) in place of the 4-quinazolone of that example.

*Example XXXIII*

3-[beta-keto-delta-amino-delta - (2 - tetrahydrofuryl) -butyl]-7-chloro-4 - quinazolone dihydrochloride monohydrate is prepared by the procedure of Example XXVI, using 3.7 parts by weight of 7-chloro-4-quinazolone (J. Am. Chem. Soc., 69, 184) in place of the 4-quinazolone of that example.

*Example XXXIV*

A mixture of 1 part by weight of 4-quinazolone, 2.0 parts by weight of beta-keto-gamma-bromopropyl-phthalimide (Ber., 44, 1908) and 14 parts by volume of a 0.5 N methanol solution of sodium methoxide is refluxed for ten minutes, cooled and the crystals filtered. Recrystallization from 2-methoxyethanol gives white crystals of 3 - (beta-keto-gamma-phthalimidopropyl)-4-quinazolone melting, with decomposition, at about 254°–256° C., soluble in hot 2-methoxymethanol but insoluble in cold solvents.

*Example XXXV*

To a benzene solution of diazomethane (prepared from 5.7 parts by weight of nitrosomethylurea) there is added, with cooling, the acid chloride from 4 parts by weight of 5-phthalimidovaleric acid (Ber. 41, 2010) in 25 parts by volume of benzene. After about one hour at room temperature, the excess diazomethane is destroyed with acetic acid and the solution treated with 12 parts by volume of 30% hydrogen bromide in acetic acid. The solvent is removed in vacuo and the residue crystallized from methanol to give white leaflets of 4-phthalimidobutyl bromomethyl ketone having a melting point of about 110°–111° C.

To a solution of .72 part by weight of 4-quinazolone in 6.3 parts by volume of a 1 N methanol solution of sodium methoxide there is added a solution of 2.1 parts by weight of 4-phthalimidobutyl bromomethyl ketone in 21 parts by volume of 2-methoxyethanol. After fifteen minutes the solid is removed by filtration. Recrystallization from 2-methoxyethanol gives white blades of 3-(beta - keto - omega - phthalimidohexyl) - 4-quinazolone having a melting point of about 204°–206° C. This compound is soluble in hot 2-methoxyethanol, but insoluble in cold solvents.

*Example XXXVI*

To a solution of 1.17 parts by weight of 4-quinazolone in 16 parts by volume of a 1 N methanol solution of sodium methoxide there is added a solution of 2.5 parts by weight of 1-bromo-4-piperidino-2-butanone hydrobromide (J. Am. Chem. Soc., 69, 126) in 25 parts by volume of methanol. After one hour the solution is diluted with 270 parts by volume of cold 5% sodium hydroxide and extracted with chloroform. Evaporation of the combined extracts to dryness in vacuo leaves 3 - (beta - keto - delta - piperidinobutyl) -4-quinazolone as an oil which is about 37% pure as shown by its ultra-violet absorption spectra typical of 3-alkyl-4-quinazolones with maxima at 267, 302 and 315 m$\mu$ in 0.1 N sodium hydroxide and 275 m$\mu$ in 0.1 N hydrochloric acid.

*Example XXXVII*

A mixture of 2 parts by weight of 4-quinazolone, 13 parts by volume of a 1 N methanol solution of sodium methoxide and 1.3 parts by volume of chloroacetone is allowed to stand twenty hours. The reaction mixture is diluted with water, filtered, saturated with salt and extracted with chloroform. The combined dried extracts are evaporated leaving about 2 parts by weight of solid. Recrystallization of this solid from water gives white crystals of 3-acetonyl-4-quinazolone having a melting point of about 157°–159° C. This compound is soluble in hot water, alcohol, chloroform or acetone, moderately soluble in cold water and insoluble in petroleum ether or benzene.

*Example XXXVIII*

3-acetonyl-5-methyl-4-quinazolone is prepared by the procedure of Example XXXVII using 2.24 parts by weight 5-methyl-4-quinazolone (Ber., 52, 1084) in place of the 4-quinazolone of that example.

*Example XXXIX*

3-acetonyl-5-chloro-4-quinazolone is prepared by the procedure of Example XXXVII using 2.48 parts by weight of 5-chloro-4-quinazolone (prepared by the procedure of Example XI) in place of the 4-quinazolone of Example XXXVII.

*Example XL*

3-acetonyl-5-chloro-8-methoxy-4-quinazolone is prepared by the procedure of Example XXXVII using 2.89 parts by weight of 5-chloro-8-methoxy-4-quinazolone (prepared by the procedure of Example IX) in place of the 4-quinazolone of Example XXXVII.

*Example XLI*

3-acetonyl-6-methoxy-4-quinazolone is prepared by the procedure of Example XXXVII using 2.41 parts by weight of 6-methoxy-4-quinazolone (J. Am. Chem. Soc., 68, 1302) in place of the 4-quinazolone of that example.

*XLII*

3-acetonyl-8-chloro-4-quinazolone is prepared by the procedure of Example XXXVII using 2.48 parts by weight of 8-chloro-4-quinazolone (prepared by the procedure of Example VI) in place of the 4-quinazolone of Example XXXVII.

*Example XLIII*

3-acetonyl-7-methyl-4-quinazolone is prepared by the procedure of Example XXXVII using 2.24 parts by weight of 7-methyl-4-quinazolone (J. prakt. Chem., (2), 51, 566) in place of the 4-quinazolone of that example.

*Example XLIV*

3-acetonyl-7-chloro-4-quinazolone is prepared by the procedure of Example XXXVII using 2.48 parts by weight of 7-chloro-4-quinazolone (J. Am. Chem. Soc., 69, 184) in place of the 4-quinazolone of that example.

*Example XLV*

To a solution of 7.5 parts by weight of phenacyl bromide in 75 parts by volume of methanol there is added a hot solution of 5 parts by weight of 4-quinazolone in 34 parts by volume of a 1 N methanol solution of sodium methoxide. The mixture is allowed to stand twenty minutes during which time the product begins to crystallize. After dilution with an equal volume of water, the mixture is filtered. The product is recrystallized from methanol to give tan crystals of 3-phenacyl-4-quinazolone having a melting point of 154°–155° C. This compound is soluble in hot methanol or hot ethanol, but insoluble in cold methanol, ethanol, water or petroleum ether.

*Example XLVI*

3-phenacyl-5-chloro-4-quinazolone is prepared by the procedure of Example XLV, using 6.2 parts by weight of 5-chloro-4-quinazolone (prepared by the procedure of Example XI) in place of the 4-quinazolone of Example XLV.

*Example XLVII*

3-phenacyl-5-methyl-4-quinazolone is prepared by the procedure of Example XLV, using 5.35 parts by weight of 5-methyl-4-quinazolone (J. prakt. Chem., (2), 51, 566) in place of the 4-quinazolone of that example.

*Example XLVIII*

3-phenacyl-5-chloro-8-methoxy-4-quinazolone is prepared by the procedure of Example XLV, using 7.24 parts by weight of 5-chloro-8-methoxy-4-quinazolone (prepared according to the procedure of Example IX) in place of the 4-quinazolone of Example XLV.

*Example XLIX*

A solution of 2 parts by weight of 4-quinazolone and 2.2 parts by weight of barium hydroxide octahydrate in 20 parts by volume of methanol and 10 parts by volume of 2-methoxyethanol is added to a solution of 3 parts by weight of phenacyl bromide in 30 parts by volume of methanol. After one hour the solution is diluted with 30 parts by volume of 10% sodium hydroxide and 125 parts by volume of iced water. The precipitated crystals are collected on a filter and washed with 50% methanol-water to obtain 3-phenacyl-4-quinazolone having a melting point of 146°–148° C.

*Example L*

To a solution of 2 parts by weight of 4-quinazolone in 20 parts by volume of methanol and 6 parts by volume of 38% aqueous trimethyl benzyl ammonium hydroxide there is added a solution of 3 parts by weight of phenacyl bromide in 30 parts by volume of methanol. After one hour the mixture is diluted with 125 parts by volume of iced water and 30 parts by volume of 10% sodium hydroxide. The resulting crystals of 3-phenacyl-4-quinazolone have a melting point of 147°–148° C. which can be raised to 153°–154° C. by recrystallization from methanol.

*Example LI*

A solution of 8.6 parts by weight of beta-furyl-beta-benzamidopropionic acid (Ann., 389, 107) in 41 parts by volume of water and 14 parts by volume of 10% sodium hydroxide is treated with 2 parts by weight of activated carbon (Norit). The filtered solution is shaken with hydrogen at 2–3 atmosphere in the presence of 0.85 part by weight of 10% palladium charcoal for about fifteen hours when reduction is complete. The filtered solution is acidified to yield beta-tetrahydrofuryl-beta-benzamidopropionic acid having a melting point of about 140–147° C. Recrystallization from water gives white crystals having a melting point of about 155–156° C. which are readily soluble in hot water, somewhat soluble in cold water, soluble in methanol ethanol, or 2-methoxyethanol, but insoluble in benzene, toluene or petroleum ether.

A solution of 5.5 parts by weight of beta-tetrahydrofuryl-beta-benzamidopropionic acid in 55 parts by volume of 6 N hydrochloric acid is refluxed three hours, cooled, filtered from benzoic acid and evaporated to dryness in vacuo. The residue is dissolved in water and the pH brought to 5 with potassium carbonate. The solution is evaporated to dryness in vacuo, the residue extracted with hot absolute alcohol, filtered from inorganic salts and the filtrate evaporated to dryness in vacuo. The residual beta-tetrahydrofuryl-beta-alanine is obtained as a gum.

A solution of 5.2 parts by weight of beta-tetrahydrofuryl-beta-alanine in 60 parts by volume of water and 46 parts by volume of 10% sodium hydroxide is carbethoxylated with two 5 parts by volume portions of ethyl chlorocarbonate by the same procedure employed in carbethoxylating 3-methoxypiperidine-2-acetic acid in Example II, to give beta-tetrahydrofuryl-beta-carbethoxyaminopropionic acid as an oil. This compound is converted to 1-bromo-4-carbethoxyamino-4-tetrahydrofuryl-2-butanone by the same procedure employed in Example II to convert 1-carbethoxy-3-methoxypiperidine-2-acetic acid to 1 - carbethoxy - 2(gamma - bromoacetonyl)-3-methoxypiperidine.

To a solution of 1.94 parts by weight of 4-quinazolone in 11.7 parts by volume of 1 N sodium methoxide there is added a solution of 3.7 parts by weight of 1-bromo-4-carbethoxyamino-4-tetrahydrofuryl-2-butanone in 40 parts by volume of methanol. After one hour the solution is diluted with 160 parts by volume of ice water and 63 parts by volume of 10% sodium hydroxide, and this mixture extracted with three 50 parts by volume portions of chloroform. Evaporation of the combined extracts and crystallization of the residue from ethyl acetate-heptane followed by recrystallization from benzene-heptane gives 3-(beta-keto-delta-carbethoxyamino-delta-tetrahydrofuryl-butyl)-4-quinazolone as white crystals having a melting point of about 125–127° C. This compound is readily soluble in alcohol, chloroform, ethyl acetate or benzene, but insoluble in water or petroleum ether.

We claim:

1. Compounds selected from the group consisting of quinazolones represented by the formula:

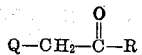

in which Q represents a 4-quinazolone nucleus having the beta-keto substituent in the 3 position, and R represents an organic radical attached to the carbonyl group by a carbon to carbon linkage, said organic radical being selected from the group consisting of monocyclic aromatic hydrocarbon radicals, monocyclic heterocyclic radicals containing a single ring nitrogen atom in a 6 membered ring as the only heterocyclic atom, monocyclic heterocyclic radicals containing a single ring nitrogen atom in a 5 membered ring as the only heterocyclic atom, lower alkyl radicals, and substituted lower alkyl radicals having at least one substituent selected from the group consisting of amino groups, acylated amino groups, lower alkyl substituted amino groups, monocyclic heterocyclic radicals containing a single ring nitrogen atom in a 5 membered ring as the only heterocyclic atom, and monocyclic heterocyclic radicals containing a single ring oxygen atom in a 5 membered ring as the only heterocyclic atom; and acid salts thereof.

2. The compounds represented by the formula:

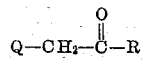

wherein Q represents a 4-quinazolone nucleus having the beta-keto substituent in the 3 position and R represents a lower alkyl radical.

3. The compounds represented by the formula:

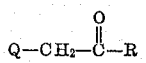

wherein Q represents a 4-quinazolone nucleus having the beta-keto substituent in the 3 position and R represents a monocyclic aromatic hydrocarbon radical.

4. 3-phenacyl-5-methyl-4-quinazolone.

5. The compounds represented by the formula:

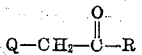

wherein Q represents a 4-quinazolone nucleus having the beta-keto substituent in the 3 position and R represents a monocyclic heterocyclic radical having a piperidyl nucleus.

6. 3-[beta-keto-beta-(1-benzoyl-4-hydroxy-3-piperidyl)ethyl]-4-quinazolone.

7. The compounds represented by the formula:

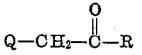

wherein Q represents a 4-quinazolone nucleus having the beta-keto substituent in the 3 position and R represents a lower alkyl radical substituted with a heterocyclic radical having a tetrahydrofuryl nucleus.

8. 3 - [beta - keto - delta - amino - delta - (2-tetra-hydrofuryl)butyl]-5-chloro-4-quinazolone.

9. The compounds represented by the formula:

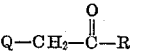

wherein Q represents a 4-quinazolone nucleus having the beta-keto substituent in the 3 position and R represents an alkyl radical substituted with a heterocyclic radical having a pyrrolidyl nucleus.

10. The 3-acetonyl-5-halo-4-quinazolones.

11. The new compound 3-acetonyl-5-chloro-4-quinazolone.

12. The 3-[beta-keto-delta-amino-delta-(2-tetrahydrofuryl)butyl]-5-halo-4-quinazolones.

13. The 3-{beta-keto-gamma-[1-acyl-3-(lower alkoxy)methyl - 2 - pyrrolidyl]propyl} - 5 - halo-4-quinazolones.

14. The new compound 3-[beta-keto-gamma-(1 - carbethoxy - 3 - methoxymethyl - 2 - pyrrolidyl)propyl]-5-chloro-4-quinazolone.

15. A method of preparing the compounds selected from the group consisting of quinazolones represented by the formula:

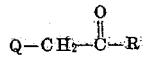

wherein Q represents a 4-quinazolone nucleus having the beta-keto substituent in the 3 position and R represents an organic radical attached to the carbonyl group by carbon to carbon linkage, said organic radical being selected from the group consisting of monocyclic aromatic hydrocarbon radicals, monocyclic heterocyclic radicals containing a single ring nitrogen atom in a 6 membered ring as the only heterocyclic atom, monocyclic heterocyclic radicals containing a single ring nitrogen atom in a 5 membered ring as the only heterocyclic atom, lower alkyl radicals, and substituted lower alkyl radicals having at least one substituent selected from the group consisting of amino groups, acylated amino groups, lower alkyl substituted amino groups, monocyclic heterocyclic radicals containing a single ring nitrogen atom in a 5 membered ring as the only heterocyclic atom, and monocyclic heterocyclic radicals containing a single ring oxygen atom in a 5 membered ring as the only heterocyclic atom: and acid addition salts thereof; which comprises contacting, under reactive conditions, a salt, selected from the group consisting of alkali metal salts, alkaline earth metal salts and quaternary ammonium salts, of a 4-quinazolone with a substituted methyl ketone of the formula:

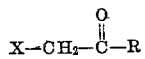

where X represents a member selected from the group consisting of halogen and sulfonic ester substituents and R is as previously defined.

16. The process of claim 15 wherein the quinazolone salt is a sodio-4-quinazolone and the substituted methyl ketone is a bromomethyl ketone.

17. A method of preparing the 3-acetonyl-4-quinazolones which comprises contacting, in an inert solvent, an alkali metal salt of a 4-quinazolone and a haloacetone.

18. The method of claim 17 when said 4-quinazolone salt is a 5-halo-4-quinazolone salt.

19. A method of preparing 3-acetonyl-5-chloro-4-quinazolone which comprises contacting, in an inert solvent, sodio-5-chloro-4-quinazolone with chloroacetone.

20. A method of preparing the 3-[beta-keto-delta - amino - delta - (2 - tetrahydrofuryl)-butyl]-4-quinazolones which comprises contacting, in an inert solvent, an alkali metal salt of a 4-quinazolone with a 1-halo-4-acidamido-4-(2-tetrahydrofuryl)-2-butanone.

21. The method of claim 20 wherein said quinazolone salt is a sodio-5-halo-quinazolone.

22. A method of preparing 3-[beta-keto-delta-amino - delta - (2 - tetrahydrofuryl)butyl] - 5-chloro-4-quinazolone which comprises contacting, in a lower alkyl alcohol solvent, sodio-5-chloro-4-quinazolone with 1-bromo-4-phthalimido-4-(2-tetrahydrofuryl)-2-butanone.

23. A method of preparing the 3-{beta-keto-gamma-[1-acyl-3-(lower alkoxy)methyl-2-pyrrolidyl]propyl}-4-quinazolones which comprises contacting, in an inert solvent, an alkali metal salt of a 4-quinazolone with a 1-acyl-2-(gamma-haloacetonyl) - 3 - (lower alkoxy)methylpyrrolidine.

24. The method of claim 23 wherein said 4-quinazolone salt is a sodio-5-halo-4-quinazolone.

25. A method of preparing 3-[beta-keto-gamma - (1 - carbethoxy - 3 - methoxymethyl-2 - pyrrolidyl)propyl] - 5 - chloro - 4 - quinazolone which comprises contacting, in an inert lower alkyl alcohol solvent, sodio-5-chloro-4-quinazolone with 1 - carbethoxy - 2 - (gamma-bromoacetonyl)-3-methoxymethylpyrrolidine.

BERNARD RANDALL BAKER.
MERLE VERNON QUERRY.

No references cited.